United States Patent
Choyi et al.

(10) Patent No.: US 12,262,206 B2
(45) Date of Patent: *Mar. 25, 2025

(54) METHODS AND SYSTEMS FOR 5G SLICING BASED ON DYNAMIC SECURITY PROPERTIES

(71) Applicant: Verizon Patent and Licensing Inc., Basking Ridge, NJ (US)

(72) Inventors: Vinod Kumar Choyi, Conshohocken, PA (US); Kristen Sydney Young, Morris Plains, NJ (US); Yousif Targali, Sammamish, WA (US); Michael A. Gallagher, Dublin, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,219

(22) Filed: May 9, 2023

(65) Prior Publication Data

US 2023/0284028 A1   Sep. 7, 2023

Related U.S. Application Data

(63) Continuation of application No. 17/143,589, filed on Jan. 7, 2021, now Pat. No. 11,683,691.

(51) Int. Cl.
| | |
|---|---|
| *H04W 12/12* | (2021.01) |
| *H04L 9/40* | (2022.01) |
| *H04W 12/60* | (2021.01) |
| *H04W 28/08* | (2023.01) |
| *H04W 28/24* | (2009.01) |

(52) U.S. Cl.
CPC ............ *H04W 12/12* (2013.01); *H04L 63/20* (2013.01); *H04W 12/66* (2021.01); *H04W 28/0831* (2020.05); *H04W 28/0835* (2020.05); *H04W 28/24* (2013.01)

(58) Field of Classification Search
CPC ............ H04W 4/50–80; H04W 63/20; H04W 8/00–245
See application file for complete search history.

(56) References Cited

U.S. PATENT DOCUMENTS

| | | | |
|---|---|---|---|
| 10,531,305 B1* | 1/2020 | Verma | H04W 12/08 |
| 2017/0142591 A1 | 5/2017 | Vrzic | |
| 2018/0084427 A1* | 3/2018 | Huo | H04W 12/041 |

(Continued)

*Primary Examiner* — San Htun

(57) ABSTRACT

Systems and methods enable the provisioning of security as a service for network slices. A network device stores definitions of multiple security assurance levels for network slices based on security parameters of assets used in the network slices. The network device stores multiple network slice templates, wherein the multiple network slice templates have different security assurance levels, of the multiple security assurance levels, for a Network Service Descriptor (NSD). The network device receives a request for a network slice with a requested security assurance level, of the multiple security assurance levels, for the NSD, and deploys the network slice using one of the network slice templates that has a security assurance level that corresponds to the requested security assurance level. The network device monitors the security parameters of the assets of the network slice for changes to the security assurance level of the deployed network slice.

20 Claims, 13 Drawing Sheets

(56) References Cited

U.S. PATENT DOCUMENTS

| | | | |
|---|---|---|---|
| 2018/0103067 A1* | 4/2018 | Nagaratnam | G06F 21/62 |
| 2019/0327782 A1* | 10/2019 | Yang | H04W 76/16 |
| 2020/0059407 A1* | 2/2020 | Lu | H04L 41/0896 |
| 2021/0075678 A1* | 3/2021 | Seetharaman | H04L 41/5048 |
| 2021/0204164 A1 | 7/2021 | Yavuz et al. | |
| 2021/0306938 A1* | 9/2021 | Seetharaman | H04W 16/18 |
| 2021/0360401 A1* | 11/2021 | Marinho | H04W 12/069 |
| 2024/0056810 A1* | 2/2024 | Celozzi | H04L 63/1433 |

* cited by examiner

| SECURITY ASSURANCE LEVELS | ASSET CLASSES | | | | | | |
|---|---|---|---|---|---|---|---|
| | OA&M Management Framework | Orchestration Framework | Platform | Data-at-Rest / Access Controls | Data-in-Transit | UE / Device | Certifications |
| Very High | Separate & Isolated | Separate & isolated | Physical Isolation + High* | HSM, PQC | True End-to-End Security (TLS 1.3) | Device-level isolation | Common Criteria, NIST |
| High | Common, SSO, secure connections | Common (higher authorization) | Cryptographic Isolation + Medium* | HSM | E2E via Hop-by-Hop (TLS 1.2) + Medium | N/A | NIST, FIPS |
| Medium | Common | Common | Routing Isolation | Secret Vault | Only Inter-site (TLS 1.2) | N/A | N/A |
| Basic | Common | Common | No Isolation | K8S | Uses Data-center protection | N/A | N/A |

FIG. 4

| SECURITY ASSURANCE LEVEL (SAL) | Platform Security Features | | | | | | |
|---|---|---|---|---|---|---|---|
| | Hypervisor / Container / Firmware / OS / Non-shared | Additional Container / VM Isolation | Isolation of Critical Functions (e.g. Auth Functions) | Platform Attestation: Type of Attestation (Remote, Local) | Hardware Root-of-Trust (e.g. TPM, TEE) | Run-time Integrity Validation | Confidentiality-protection at run-time | Secure Migration of VNFs |
| Very High | X | X | X | X | X | X | X | X |
| High | X | X | X | X | X | X | | |
| Medium | X | X | X | | | | | |
| Basic | X | | | | | | | |

FIG. 5

| Parameters | |
|---|---|
| Value | Integer / String |
| Measurement unit | N/A |
| Example | 0: No Isolation<br>1: Physical Isolation<br>2: Logical Isolation<br>3: Cryptographic Isolation |
| Tags | Character Attribute / Functional |

902

| Cryptographic Isolation | |
|---|---|
| Parameters | |
| Value | Integer / String |
| Measurement unit | N/A |
| Example | 0: Standard Crypto<br>1: Strong Crypto (e.g., 128 bit security)<br>2: Very Strong Crypto (e.g., 256 bit security public keying mechanism)<br>3: PQC Crypto |
| Tags | Character Attribute / Functional |

FIG. 9

METHODS AND SYSTEMS FOR 5G SLICING BASED ON DYNAMIC SECURITY PROPERTIES

CROSS-REFERENCE TO RELATED APPLICATION

This application is a continuation of U.S. patent application Ser. No. 17/143,589, filed on Jan. 7, 2021, and titled "Methods and Systems for 5G Slicing Based on Dynamic Security Properties," the contents of which are incorporated herein by reference.

BACKGROUND INFORMATION

Advanced wireless networks, such as Fifth Generation (5G) networks, have the capability to perform network slicing to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access networks, clouds, transport, Central Processing Unit (CPU) cycles, memory, etc. Furthermore, each network slice may be configured to meet a different set of requirements and be associated with a particular Quality of Service (QoS) class, type of service, and/or particular group of enterprise customers associated with mobile communication devices.

Cyber security is important for organizations that conduct their transactions over networks. For telecommunication service providers, assuring security to customers (e.g., enterprise customers) can be extremely difficult, since newer attacks that exploit existing vulnerabilities, or attacks that exploit newer applications and services, are extremely difficult to predict and test before slice deployment.

BRIEF DESCRIPTION OF THE DRAWINGS

FIG. 4 is a table illustrating slice assets grouped by Security Assurance Level (SAL), according to an implementation;

FIG. 5 is a table illustrating different SALs based on platform security;

FIG. 9 is a diagram illustrating an isolation parameter for a network slice asset, according to an implementation described herein.

DETAILED DESCRIPTION

Figure 1:
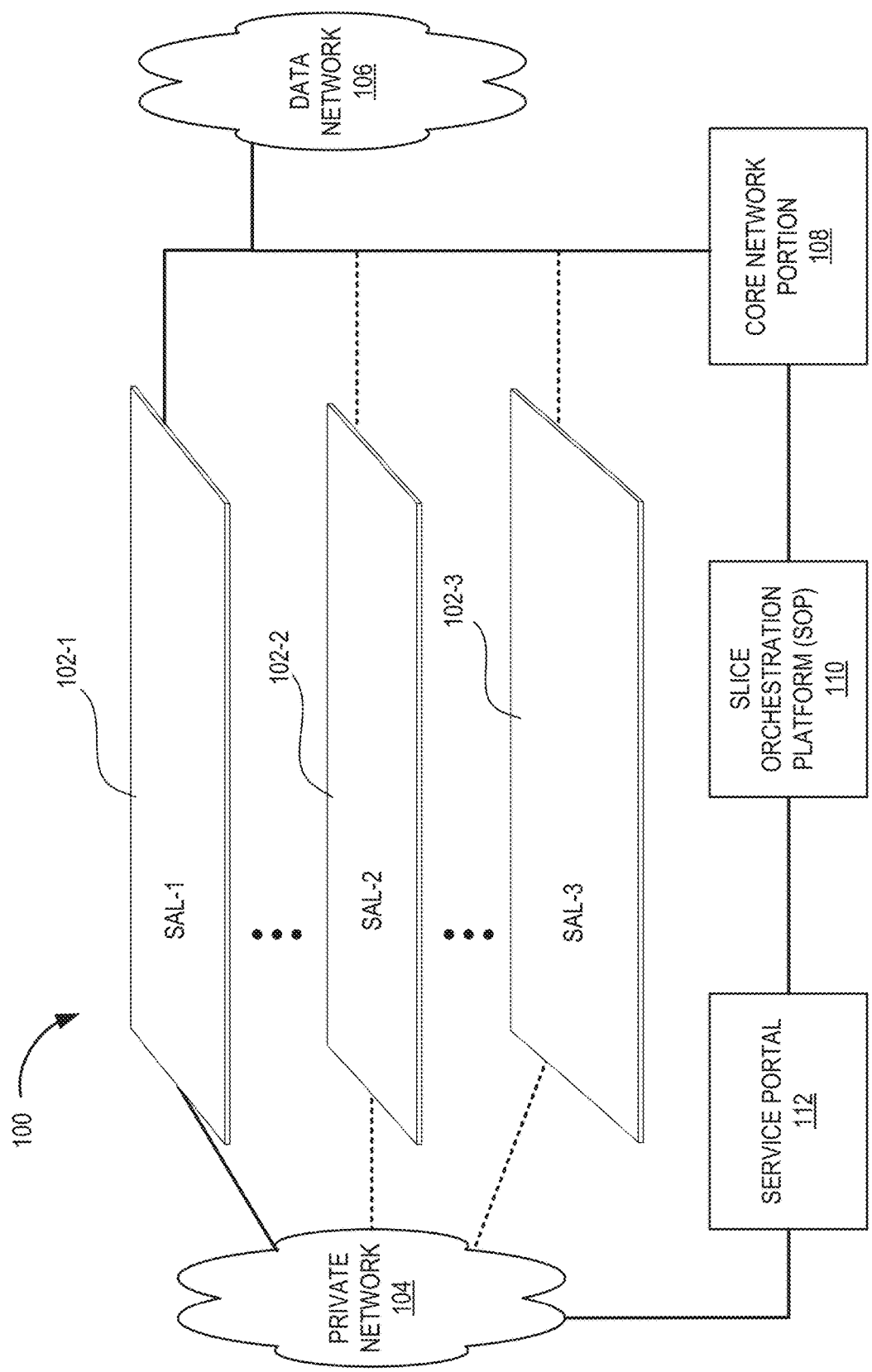
FIG. 1 is a diagram illustrating concepts described herein.

The following detailed description refers to the accompanying drawings. The same reference numbers in different drawings identify the same or similar elements.

Security assurance within an IT infrastructure varies with the addition of new software, firmware updates, hardware updates, upgrades and the like, and new applications.

Because of these factors, security assurance for a particular organization or network generally decreases over time and becomes very difficult to maintain. Some network customers (e.g., government agencies) may require higher security assurance compared to other customers (e.g., consumer services) and, therefore, tailoring security features for each customer in an end-to-end manner has traditionally not been possible. Generic security for all customers has been the norm.

Once an attack on a network has been detected, attack mitigation is performed by using a combination of security functions that may take appropriate actions (e.g., blocking, re-routing, etc.) with the hope of stopping, or mitigating, the attack. These mitigation actions can, however, affect service delivery, and the consequences experienced can be those as intended by the attacker.

In contrast with Quality of Service parameters for network slicing, for example, there has previously been no set of end-to-end Quality of Security parameters. Consequently, there has been no comprehensive mechanism to upgrade to a higher Quality of Security package on-demand or based on degradation of such end-to-end Quality of Security parameters. Previous efforts have provided narrow "quick fix" approaches (e.g., throttling an attack). Additionally, there has previously been no mechanism to observe the security assurance of the network in a continuous manner.

Thus, systems and methods described herein provide parameters to define security assurances for end-to-end network connections. The parameters can be applied to network slices to define slices with different Security Assurance Levels (SALs). The SAL may be determined via a unique scoring system that uses a combination of individual scores associated with assets to generate a per slice consolidated SAL value. The systems and methods may also enable dynamic transitions to slices with different SALs to mitigate cyber-attacks.

True end-to-end per slice monitoring, tuning, and SAL verification includes the transport domain as part of the end-to-end solution. As described further herein, true mapping of a 3GPP slice identifier to the transport domain may be used (e.g., instead of aggregation with many-to-one mapping between 3GPP and transport domain). With true end-to-end per slice SAL verification, an operator can offer different SALs to network customers. Such measures allow customers (e.g., enterprise or private networks) to be provided with a strong isolation for their slice, so that service disruption in a slice does not affect leakage of sensitive and confidential data.

In one aspect, network slices may be tailored with SALs based on a customer's risk appetite and budget. According to another aspect, individual network assets may be evaluated against Quality of Security parameters, and SALs of a network slice may be cumulatively computed on a continuous or on a periodic basis. In yet another aspect, a slice that has a relatively higher SAL may be orchestrated and deployed to mitigate an attack on a current slice, with minimal effect on service delivery.

FIG. 1 depicts concepts described herein. As shown, a provider network 100 includes network slices 102-1 through 102-3 (referred to collectively as network slices 102) that may be used connect a private network 104 to a data network 106. Network 100 also includes a core network portion 108, a slice orchestration platform (SOP) 110, and a service portal 112. The number and arrangement of the components 102-112 are exemplary. In actual implementations, network 100 may include additional, fewer, or a different arrangement of components than those illustrated in FIG. 1.

In FIG. 1, private network 104 may be serviced by one or more of corresponding network slices 102-1 through 102-3. For simplicity, FIG. 1 does not show virtual network functions that are included in each of network slices 102. Data network 106 may provide services to devices in private network 104 over the corresponding network slices 102-1 through 102-3. Core network portion 108 includes components of a particular portion of network 100, herein referred to as a "core network." As described further herein, some components of core network portion 108 may be included within one or more of network slices 102.

SOP 110 includes logic for designing, testing, deploying, and adapting network slices 102. For example, SOP 110 may provide network assets with different security ratings (e.g., designed and tested), incorporate the assets into architected network slices 102, and deploy the network slices 102 over edge and core networks of provider network 100. The overall SAL of each network slice 102 may be scored, for example, based on the compilation of asset scores in each network slice 102. Assets may be security infrastructure components dedicated to security functions (e.g. virtualized firewall or DDoS prevention functions) or may be functions that perform security related functions (e.g., hardware assets, virtual assets, network functions, software functions, forwarding graph descriptors, virtual link descriptor, etc.). SOP 110 may catalog deployed security infrastructure and associated assets with a service in inventory.

Service portal 112 may include logic that provides a user interface (e.g., a web-based interface) for a customer to configure slice security services. Service portal 112, according to one implementation, may include a network device that provides structured selections for network security features desired by a customer (e.g., a network administrator for private network 104). In another implementation, service portal 112 may provide selectable service requirement levels that are mapped to particular security features.

As an illustrative use case, assume provider network 100 offers different security levels for network services, such as basic (e.g., SAL-1), medium (e.g., SAL-2), and high (e.g., SAL-3). An administrator of private network 104, for example, may use service portal 112 to request a basic security level for private network 104. By using a catalog of network assets with prescribed security values, SOP 110 may design and deploy network slice 102-1 with the requested basic security assurance level (e.g., "SAL-1"). In the event an attack is detected within network slice 102-1, SOP 110 may automatically design and deploy a different network slice for private network 104 (e.g., network slices 102-2 or 102-3, with a higher security level).

Figure 2:
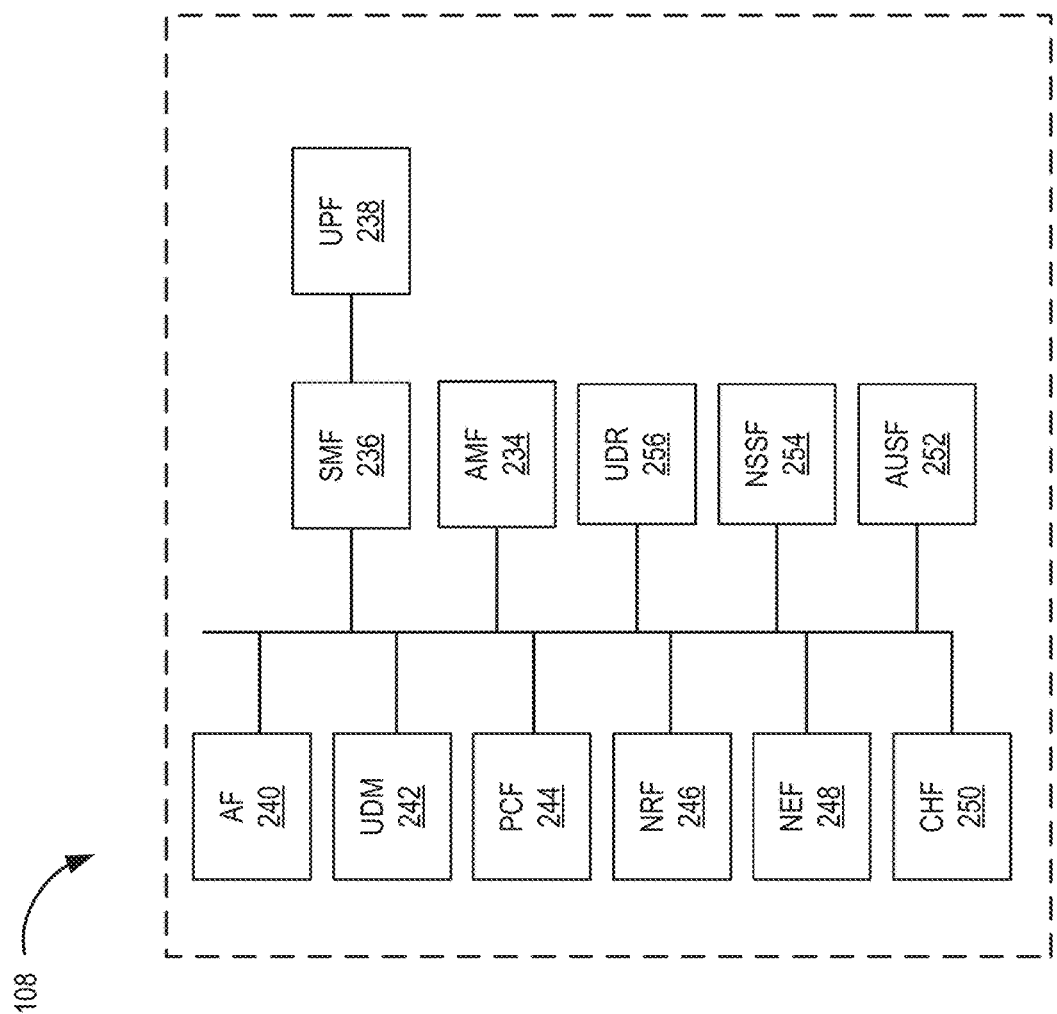
FIG. 2 is a diagram illustrating functional components of the core network portion of FIG. 1, according to an implementation described herein.

FIG. 2 illustrates exemplary functional components of core network portion 108 of FIG. 1. SOP 110 may also deploy virtualized versions of one or more of the components shown in FIG. 2, as part of network slice 102. In FIG. 2, core network portion 108 is shown as a 5G core network, although other types of core network components are possible. Portion 108 includes a number of network function (NFs). These NFs include: an Access and Mobility Function (AMF) 234 to perform registration management, connection management, reachability management, mobility management, and/or lawful intercepts; a Session Management Function (SMF) 236 to perform session management, session modification, session release, IP address allocation and management, Dynamic Host Configuration Protocol (DHCP) functions, and selection and control of a User Plane Function (UPF) 238; and a UPF 238 to serve as a gateway to packet data network, act as an anchor point, perform packet inspection, routing, and forwarding, perform QoS handling in the user plane, uplink traffic verification, transport level packet marking, downlink packet buffering, and/or other type of user plane functions.

Core network portion 108 further includes: an Application Function (AF) 240 to provide services associated with a particular application; a Unified Data Management (UDM) 242 to manage subscription information, handle user identification and authentication, and perform access authorization; a Policy Control Function (PCF) 244 to support policies to control network behavior, provide policy rules to control plane functions, access subscription information relevant to policy decisions, and perform policy decisions; a Network Repository Function (NRF) 246 to support service discovery, registration of network function instances, and maintain profiles of available network function instances; a Network Exposure Function (NEF) 248 to expose capabilities and events to other network functions, including third party network functions; a Charging Function (CHF) 250 to perform charging and billing functions; an Authentication Server Function (AUSF) 252 to render authentication services and other security related services to other network components; a Network Slice Selection Function (NSSF) 254 to select a network slice instance to serve a particular private network 104 or user equipment (UE); a Unified Data Repository (UDR) 256 to provide a repository for subscriber information and other types of information; and/or other types of network functions.

For simplicity, FIG. 2 does not show all components that may be included in core network portion 108 (e.g., routers, bridges, wireless access point, additional networks, etc.). That is, depending on the implementation, network portion 108 may include additional, fewer, different, or a different arrangement of components than those illustrated in FIG. 2. Furthermore, one or more components of core network portion 108 may also be implemented within a network slice 102.

Figure 3A:
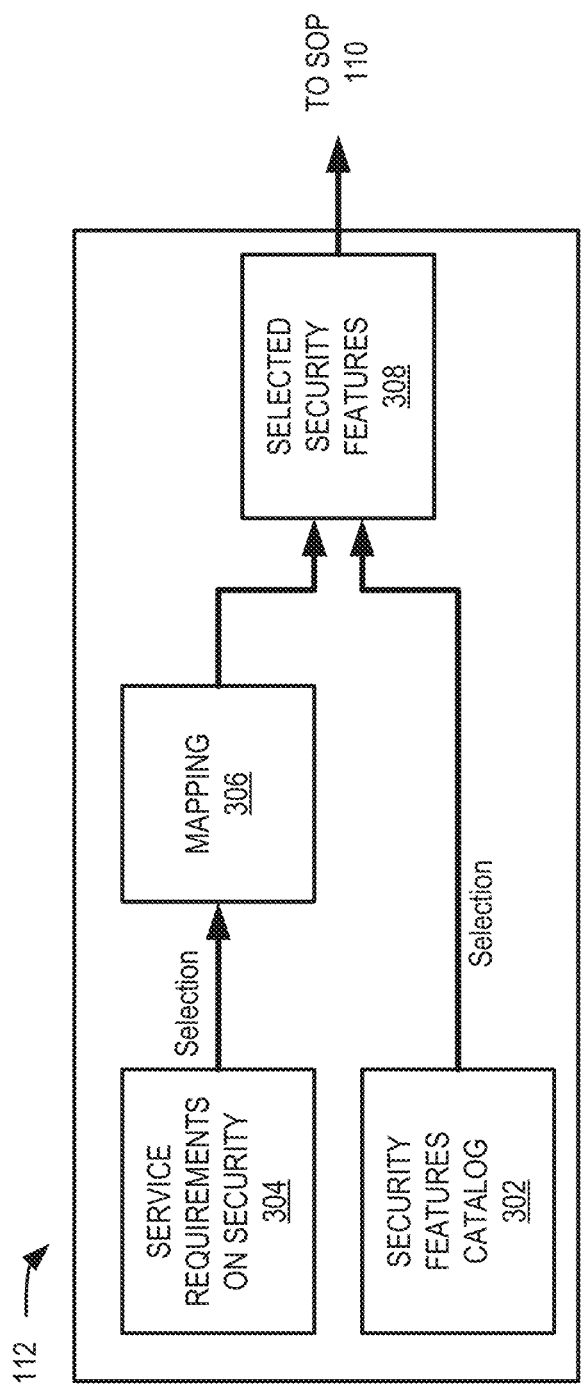
FIG. 3A is a block diagram illustrating exemplary logical components of the service portal of FIG. 1.

FIG. 3A illustrates exemplary logical components of service portal 112. Service portal 112 may include security features catalog 302, service requirements on security 304, mapping logic 306, and selected features 308.

According to one implementation, service portal 112 may provide a user interface to present a catalog of security features 302 for customer to select. The catalog of security features 302 may include, for example, particular security features such as isolation, certifications, cryptography, etc., that may be used to provide security in a network slice. Security features are described further in connection with FIGS. 4 and 5, for example.

In another implementation, service portal 112 may allow a user to input service requirements 304 for particular network assets. The service requirements on security 304 may include, for example, SAL options for a network slice (e.g., basic, medium, high, very high, etc.). In this latter case, mapping logic 306 may maintain a mapping of service requirements 304 to security features. According to one implementation, mapping logic 306 may map selected service requirements to a features in slice security class definitions 312 (FIG. 3B) described further below.

In the event of user selection from either security features catalog 302 or service requirements 304 (that are mapped to particular security features), the selected security feature 308 may be associated with the customer account and forwarded to SOP 110.

Figure 3B:
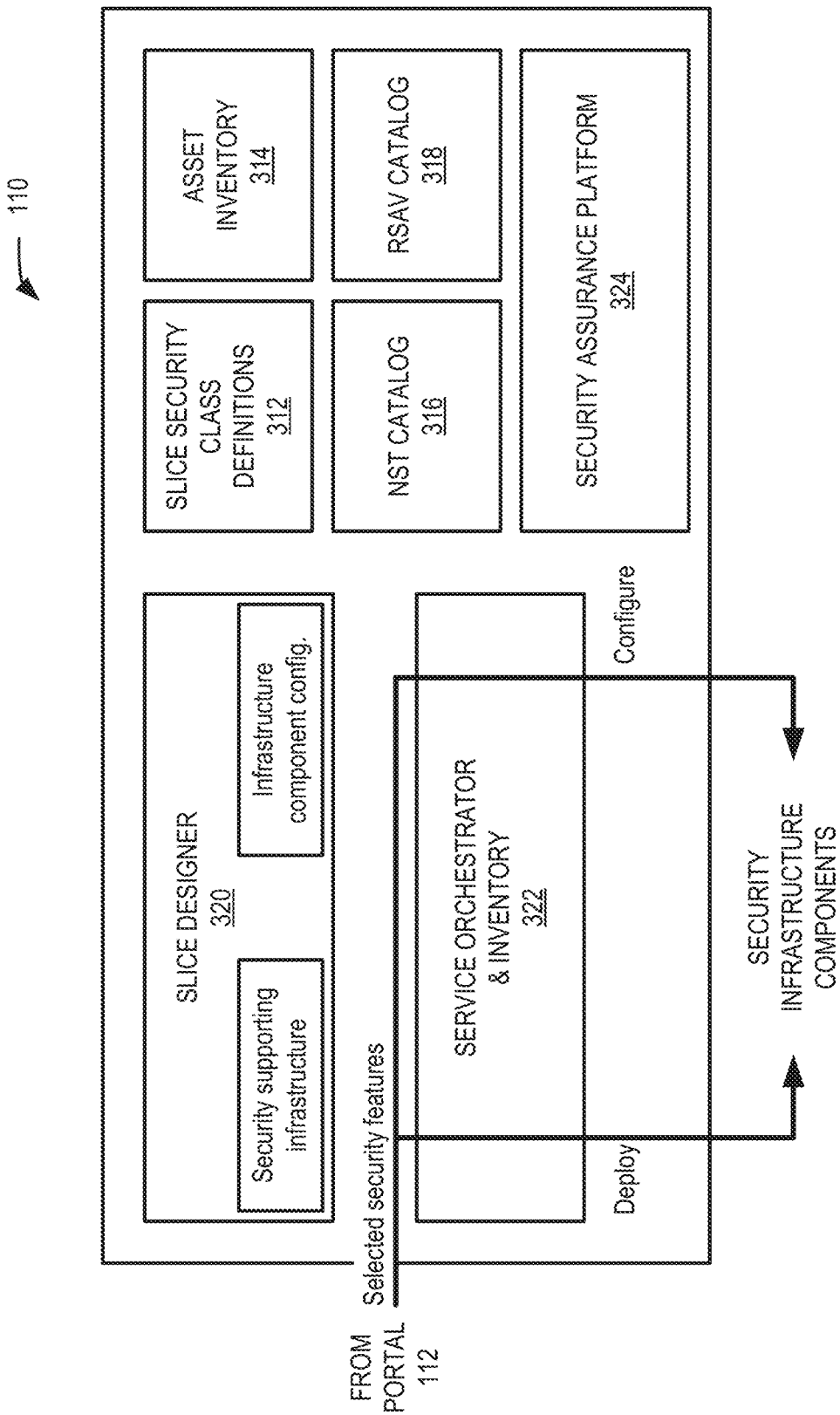
FIG. 3B is a block diagram illustrating exemplary logical components of the slice orchestration platform of FIG. 1.

FIG. 3B illustrates exemplary logical components of SOP 110. SOP 110 may include slice security class definitions 312, asset inventory 314, network slice template (NST) catalog 316, relative security assurance values (RSAV) catalog 318, slice designer 320, service orchestrator and inventory logic 322, and a security assurance platform 324.

Slice security class definitions 312 may include descriptions of slices based on security considerations. According to one implementation, slices may be categorized with different security classes, such as Very High Assurance, High Assurance, Medium Assurance, Low Assurance, although other amounts and descriptions of classifications may be used. Generally, a SAL for a network slice may be defined by certain parameters or combinations of parameters. FIG. 4 provides an illustration of how slice assets may be grouped by SAL. Although four SALs are shown in FIG. 4, in other implementations more or fewer SALs may be used.

Referring to FIG. 4, a table 400 associates SALs in field 402 with different security measures for asset classes 404. Asset classes 404 may include physical components, virtual components, files, processes, certifications, end user device (e.g. 5G User Equipment) or any other configurable feature of a network slice. Different security measures may be applied to each asset class 404 that affect the overall security (e.g., as indicated by the SAL) of a network slice. Thus, SALs in SAL field 402 may be defined by parameters of assets in asset class fields 404. In the example of FIG. 4, asset classes 404 may include Operations, Administration and Management (OA&M)/Management Framework field 406, orchestration framework field 408, platform field 410, data-at-rest/access controls field 412, data-in-transit field 414, UE/device field 416, and certifications field 418. The asset classes 404 are examples and may include other asset classes. In other cases, some of the asset classes may be omitted.

OA&M/Management Framework field 406 may include parameters of management of devices/functions in a network slice. Security parameters of OA&M/Management Framework field 406 may be based on to whom and how access to slice management is provided. In a basic or medium SAL configuration, customers (e.g., private network 104) may use a common management framework from provider network 100, which may permit administrative sign-on from multiple management entities (multiple enterprise network administrators) that use a slice. In a high SAL configuration, a single sign-on (SSO) may be required with secure connections between the management entity and each of the network elements/functions in the slice. In a very high SAL configuration, a separate management hardware/software and administrator from other slice management frameworks may be used for management of a customer slice. Additionally, in a very high SAL, the persons (humans) and machines that may be used for managing and configuring the various functions within that slice will not be shared with other slices.

Orchestration framework field 408 may include parameters for performing initial configuration of devices/functions for a network slice. Security parameters of orchestration framework field 408 may be based on, for example, to whom and by what devices orchestration is provided. Similar to security parameters of OA&M/Management Framework 406 described above, access restrictions to an orchestration framework may increase from the basic SAL to the very high SAL. At the very high SAL, for example, slice orchestration may be performed only by separate, isolated devices dedicated for the particular slice/private network 104.

Platform field 410 may include parameters for the actual physical hardware for a network slice. Security parameters of platform field 410 may be based on, for example, a degree of isolation that is provided. For example, a slice with basic SAL may have no isolation; a slice with medium SAL may provide routing isolation (e.g., by means of routing traffic separately for each slice) for network functions; and a slice with high SAL may include cryptographic isolation along with routing isolation. A slice with very high SAL may require a platform with physical isolation (e.g., dedicated devices), cryptographic isolation, and routing isolation. Platform field 410 may additionally include the transport asset class, which may include the type of access network (e.g., radio access network, such as 5G RAN, WiFi, or fixed access network), core network (e.g., 5G core network functions) and routing/switching backbone network (e.g., MPLS backbone, 802.11 wireless, etc.). In other implementations, the transport asset class may be included as a separate field of asset class 404. As an example, a fixed network may be used where very high SAL is needed, a 3GPP radio access network may be used where high SAL is needed, a WiFi network using with 802.11i protocols is used where medium SAL is needed, and a WiFi access network that does not use 802.11i-based security may be used where basic SAL is needed. As another example, in the case of WiFi, if an Extensible Authentication Protocol-Authentication and Key Agreement prime (EAP-AKA') authentication method is used then it may also be used as the access network along with 3GPP access network where high SAL is needed.

Data-at-rest/access controls field 412 may include parameters for stored data associated with a network slice. Security parameters of data-at-rest/access controls field 412 may be based on, for example, different types of storage resources and encryption techniques. Storage and access control requirements may increase from the basic SAL to the very high SAL. At the basic SAL, a slice may use data storage features of a standard container orchestration platform (e.g., K8S). At the medium SAL, a slice may use additional password security for data storage, such as rotating passwords. At the high SAL, a slice may use a hardware security module (HSM). A slice with very high SAL would require an HSM with post-quantum cryptography (PQC).

Data-in-transit field 414 may include parameters for routing of data over a network slice. Security parameters of data-in-transit field 414 may be based on, for example, different routing protocols. For example, at the basic SAL, a slice may use the protections available through a data center. A medium SAL slice may use inter-site Transport Layer Security (TLS), such as TLS 1.2 protocol. A high SAL slice may use the medium SAL protections plus end-to-end (E2E), hop-by-hop TLS 1.2 protocol. In contrast, at the very high SAL, a slice may use true end-to-end security, such as Transport Layer Security (TLS) 1.3 protocol.

UE/device field 416 may include parameters for end devices using a network slice. Security parameters of UE/device field 416 may be based on, for example, isolation of end devices. For example, at the basic, medium and high SAL, a slice may not require that applications accessing a slice be executed on a dedicated end device. In contrast, an application may require a dedicated end device to be used with a very high SAL slice. Alternatively, isolation within the device may be provided by leveraging dedicated security enclaves for each application or service and the service/application data is protected within the enclave associated with the application also ensuring that there is no leakage of data between applications within the device. When used with the Data-in-Transit 414 protection for very high SAL, true end-to-end encryption and integrity protection is provided from the enclave (dedicated area within the memory of the CPU) to the end application server.

Certifications field 418 may include parameters for certification of certain assets using a network slice. Security parameters of certifications field 418 may be based on, for example, certifications required to be included in a SAL slice. For example, at the basic SAL, a slice or the assets that make up the slice may not require any particular certifications. At other SALs, a slice and/or asset classes or assets may require National Institute of Standards and Technology (NIST) certifications, Federal Information Processing Standard (FIPS) certification, Information Technology Security Evaluation (ITSE) common criteria certification, or other certifications. An example that illustrates the use of certification 418 asset classes for very high SAL is for one or more platform asset class and associated assets within the platform asset classes to be certified using common criteria.

Table 400 provides an example of different parameters used to define each of the SALs in SAL field 402. In other implementations, the SALs in SAL field 402 may be defined by different combinations of parameters. For example, the basic SAL may be defined by different parameter values in any of OA&M/Management Framework field 406, orchestration framework field 408, platform field 410, data-at-rest/access controls field 412, data-in-transit field 414, UE/device field 416, and certifications field 418. Furthermore, although seven asset class fields 404 are shown in table 400, in other implementations, more, fewer, or different asset classes may be used to define the different SALs in SAL field 402. For example, platform field 410 may be broken out into multiple fields, such as a separate transport asset class field.

In one implementation, a single asset class (e.g., from table 400) may serve as the basis for defining a SAL. As an example, FIG. 5 illustrates SALs based on platform security (e.g., corresponding to platform field 410 of FIG. 4). In FIG. 5, a table 500 associates SALs in field 502 with different platform security features 504. Platform security features 504 may include hypervisor isolation field 506, virtual machine (VM) isolation field 508, critical function isolation field 510, platform attestation field 512, hardware root of trust field 514, run-time integrity field 516, confidentiality protection at runtime field 518, and secure migration field 520. In the example of table 500, each of platform security features 504 may provide a binary option indicated with a mark (e.g., "x") if the feature is included for a corresponding SAL in SAL field 502.

Hypervisor isolation field 506 may define a parameter for isolation of a hypervisor, a container, firmware, and/or an operating system for a network slice. In the case of very high SAL, the isolation may be achieved using separate and dedicated hardware, VM isolation field 508 may define a parameter for isolation of virtual machine or additional containers for the network slice. Critical function isolation field 510 may define a parameter for isolation of critical functions, such as an authentication function (e.g. isolation of 5G AUSF—authentication server function), for the network slice. In the case of basic SAL, there may be no capability to offer isolation of critical functions, whereas any SAL that is greater than the basic level can be provided with isolation of critical functions. The isolation may range from container isolation for basic SAL to physical isolation on a separate compute and storage system for very high SAL.

Platform attestation field 512 may define a parameter for attesting that the platforms for the network slice are running on the approved platforms and systems by means of verifying the integrity of the various assets within the platform used for that SAL. Hardware root of trust field 514 may define one or more parameters for having a hardware root-of-trust, such as a root-of-trust (e.g., permanent read-only encryption keys) for a trusted platform module (TPM) or trusted execution environment (TEE). Run-time integrity field 516 may define one or more parameters requiring that the integrity of code associated with the assets within the slice for the SAL be validated at run-time. Confidentiality protection field 518 may define one or more parameters requiring verification that that confidentiality of encrypted software is protected at run-time in memory. Secure migration field 520 may define one or more parameters for verifying secure migration of virtual network function (VNFs) between components (e.g., from one compute and store to another) without divulging and leaving residual confidential and private data in the older component.

Table 500 illustrates how a SAL may be differentiated for one asset class 404. In practice, a network provider may provide differentiation for all or multiple asset classes 404. For example, referring to FIG. 4, a customer (e.g., private network 104) may request a network slice that has medium SAL for a platform (e.g., platform field 410) and a high SAL for an orchestration framework (e.g., orchestration framework field 408).

Returning to FIG. 3B, asset inventory 314 may include a record of assets that are available to design/deploy network slices. According to an implementation, asset inventory 314 may be a dynamic list that tracks resource status (e.g., available/unavailable), functionality, and security parameters. Asset inventory 314 may include, for example, assets in each of the asset classes 404 described above in connection with FIG. 4.

Network slice template (NST) catalog 316 may include a catalog of network slice templates, including templates with particular SAL values. Different combinations of asset parameters may be mapped to different SALs. Slice service requirements (e.g., bandwidth, latency, etc.) may be defined by Network Service Descriptors (NSDs). For each NSD, SOP 110 may generate SAL-specific slice characteristics and an associated NST (NST_SAL) that may be inherited from the NST for each NSD. For example, for a single NST associated with an NSD, SOP 110 may generate multiple SAL-level NSTs (e.g., a very high SAL NST (NST_SAL_VH), a high SAL NST (NST_SAL_H), a medium SAL NST (NST_SAL_M), and a basic SAL NST (NST_SAL_B)). The number of NST_SAL variants may correspond to the number of available SAL levels (e.g., basic, medium, high, very high, etc.). The SAL values may be qualitative or quantitative that may provide additional granularity (e.g. scale of 1-10, with "6" referred to as high SAL, "7" referred to as high SAL+ and "8" referred to as high SAL ++).

RSAV catalog 318 may include a relative security assurance value for individual assets in provider network 100. The RSAV may be calculated for every asset (e.g., every asset of asset inventory 314) based on known security/vulnerability standards, certifications, and/or environment factors. According to an implementation, RSAVs may be updated continuously, dynamically, or periodically for each asset. According to an implementation, a security assurance value may be calculated for each asset using certifications that the asset may have gone through (e.g. Common Criteria, NIST FIPS), security tool records, and/or vulnerability records that may be associated with the asset. For example, a list of asset certifications and vulnerability records may be maintained by provider network 100, which may be associated with a security number/rating. Score values may be normalized to an arbitrary scale (e.g., 0 to 1, 1 to 100, −5 to +5, etc.) that can be used to differentiate among different assets. The security assurance computation may be performed, for example, by slice designer 320 or another logical component of SOP 110.

An example of such an RSAV computation may involve identifying an asset class (e.g., Denial-of-Service (DoS) protection), which may be made up of sub-asset classes (e.g. flooding protection sub-asset class, firewall sub-asset class, DDoS protection sub-asset class, malware protection sub-asset class). The RSAV associated with an asset in the DoS protection sub-asset class, may be influenced by the RSAV associated with DoS protection asset-class and the RSAV associated with the sub-asset class (e.g., firewall sub-asset class). The assets may be products that are offered by different vendors for the same sub-asset class (e.g., vendor A has a firewall and vendor B has a firewall that may have different RSAV). The SAL value of the asset from vendor A and vendor B may be computed by making an assessment (e.g., audit, certification checks, vulnerability assessment, pen-testing, performance testing, etc.) of the asset. The RSAV value of the asset may then be computed using a function that takes into account RSAV value associated with the asset class, RSAV value associated with the sub-asset class, and the measured SAL value of the asset itself.

The RSAV of an asset class and sub-asset class may not change for some periods of time; however, the SAL value of the asset itself can vary depending upon vulnerabilities that are discovered in the product (e.g., Common Vulnerability Exposure (CVE)). The RSAV of an asset class or sub-asset class may change depending upon research conducted over a long period of time and is more static in nature. An example of such analysis is on the usefulness of a firewall in mitigating malware attack, which was deemed to be the only way to protect a network years ago and the RSAV of using a firewall have decreased over the decades. However, the SAL value of an asset can change for each new release of the asset (e.g., hardware, software, firmware), since the asset can use in-secure coding and configuration that may creep in during a version update or discovery of previously unknown vulnerabilities.

Slice designer 320 may design network slices with security parameters corresponding to available security features. For example, slice designer 320 may compile asset parameters from asset inventory 314 to design a network slice with service features (e.g., defined by an NSD) and a security rating (e.g., basic, medium, high, very high, etc.) According to an implementation, slice designer 320 may design SAL-specific network slice templates that are stored in NST catalog 316. For example, slice designer 320 may use slice security class definitions 312 and generate consolidated Theoretical SAL Values (TSV) using the security parameters for each SAL. For each NSD and SAL, slice designer 320 may generate SAL-specific slice characteristics and an associated NST_SAL* that are inherited from an NST associated with each NSD. Slice designer 320 may store each NST_SAL in NST catalog 316. Additionally, slice designer 320 may measure and store a Relative Security Assurance Value (RSAV) of each asset from asset inventory 314.

Service orchestrator and inventory 322 may receive selected security features 308 from portal 112 and, in response, retrieve from NST catalog 316 an NST template that has a theoretical SAL value that meets or exceeds the customer's requested SAL value. Service orchestrator and inventory 322 may determine, from asset inventory 314 if there are resources available to initiate the requested slice and select (using RSAV catalog 318) assets with RSAVs that match or exceed those required in the NST_SAL template.

Security assurance platform 324 may determine a baseline profile (e.g., a numerical value) for the deployed network slice, based on RSAVs for the individual attributes in a deployed slice. Using the baseline as a threshold, security assurance platform 324 may monitor for actual change in a measured SAL value (MSV) that falls below the threshold or on detection of actual attacks (e.g., based on indications provided by an intrusion detection/prevention system). If an attack is detected, security assurance platform 324 may determine if there is an available candidate assets (e.g., with a higher RSAV) within an asset class to reconfigure the network slice with the candidate asset. If so, security assurance platform may automatically adapt the deployed network slice configuration with a different mitigation asset. If the MSV is still below the threshold or the attack has not been mitigated then a different asset within the asset class with a higher RSAV is selected and the slice is re-configured with the new asset. If there is not an available candidate asset, security assurance platform 324 may switch traffic to a higher security slice.

Although FIGS. 3A and 3B show exemplary logical components of SOP 110 and service portal 112, in other implementations, SOP 110 and service platform 112 may include fewer components, different components, differently arranged components, or additional components than depicted in FIGS. 3A and 3B. Additionally or alternatively, one or more components of SOP 110 or service portal 112 may be included in the other of service portal 112 or SOP 110. For example, slice security class definitions 312 may be stored or jointly accessed by service portal 112.

Figure 6:
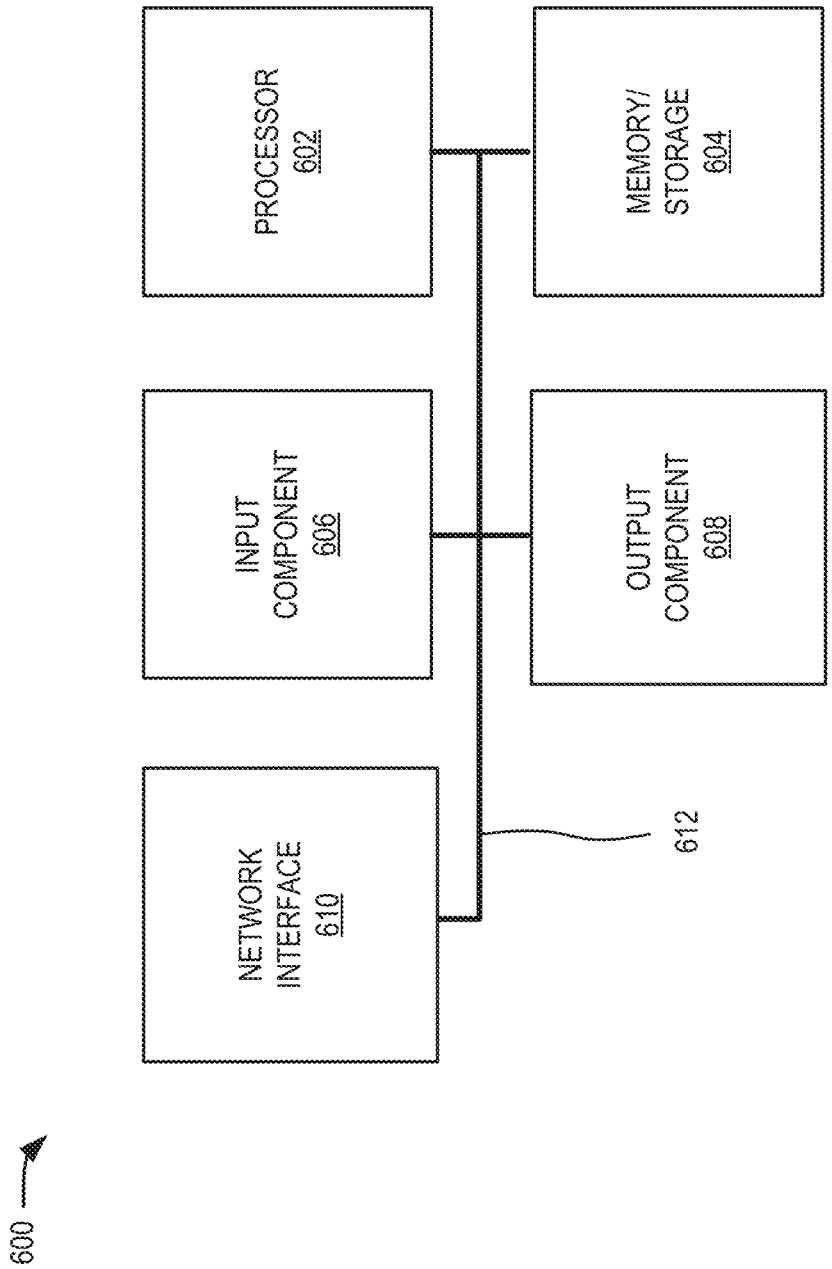
FIG. 6 is a diagram illustrating exemplary components of a device that may be included in a component of FIGS. 1-3B, according to an implementation described herein.

FIG. 6 depicts exemplary components of an exemplary network device 600. One or more of network device 600 correspond to, are included in, or provide a hardware platform for implementation of any of the network components of FIGS. 1-3B (e.g., a router, a network switch, servers, gateways, wireless stations, an end device, SOP 110, service portal 112, components of SOP 110 and service portal 112, etc.). As shown, network device 600 includes a processor 602, memory/storage 604, input component 606, output component 608, network interface 610, and communication path 612. In different implementations, network device 600 may include additional, fewer, different, or a different arrangement of components than the ones illustrated in FIG. 6. For example, network device 600 may include a display, network card, etc.

Processor 602 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling device 600 and/or executing programs/instructions.

Memory/storage 604 may include static memory, such as read only memory (ROM), and/or dynamic memory, such as random-access memory (RAM), or onboard cache, for storing data and machine-readable instructions (e.g., programs, scripts, etc.).

Memory/storage 604 may also include an optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 604 may be external to and/or removable from network device 600. Memory/storage 604 may include, for example, a Universal Serial Bus (USB) memory stick, a dongle, a hard disk, off-line storage, a Blu-Ray® disk (BD), etc. Memory/storage 604 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 606 and output component 608 may provide input and output from/to a user to/from device 600. Input and output components 606 and 608 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 600.

Network interface 610 may include a transceiver (e.g., a transmitter and a receiver) for network device 600 to communicate with other devices and/or systems. For example, via network interface 610, network device 600 may communicate with devices in private network 104. Network interface 610 may also include an Ethernet interface to a LAN, and/or an interface/connection for connecting device 600 to other devices (e.g., a Bluetooth interface). For example, network interface 610 may include a wireless modem for modulation and demodulation.

Communication path 612 may enable components of network device 600 to communicate with one another.

Network device 600 may perform the operations described herein in response to processor 602 executing software instructions stored in a non-transient computer-readable medium, such as memory/storage 604. The software instructions may be read into memory/storage 604 from another computer-readable medium or from another device via network interface 610. The software instructions stored in memory or storage (e.g., memory/storage 604, when executed by processor 602, may cause processor 602 to perform processes that are described herein.

Figure 7A:
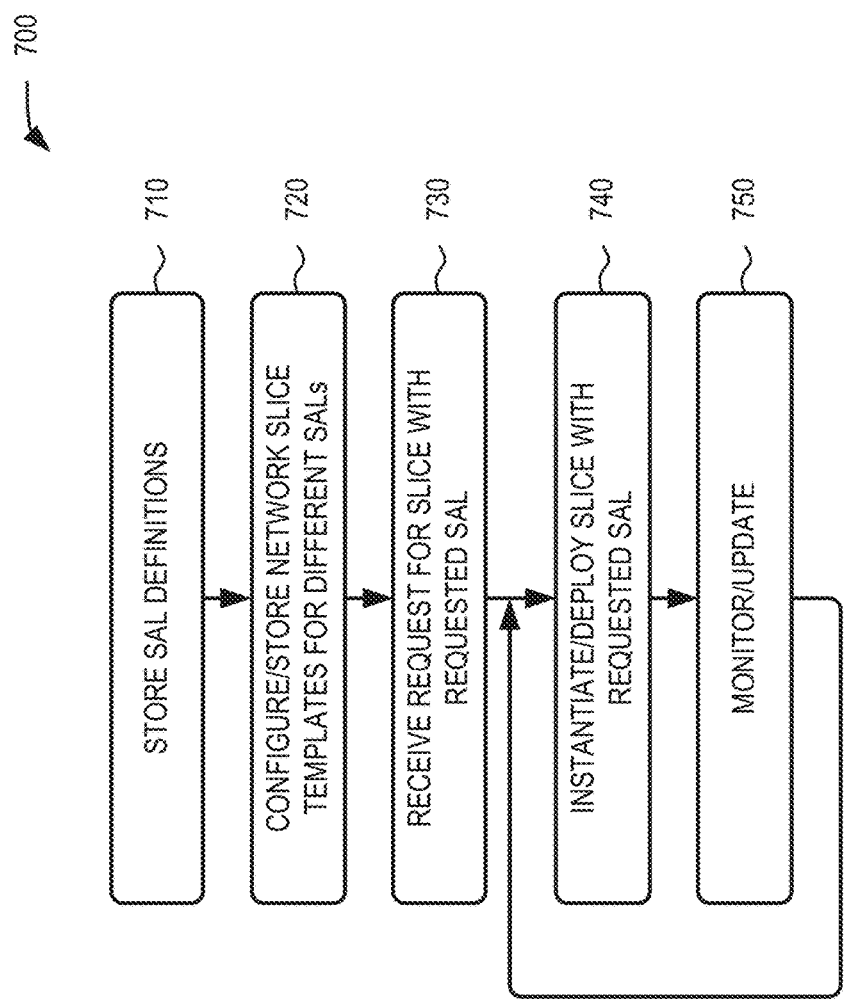
FIGS. 7A-7B are flow diagrams illustrating an exemplary process for providing network slices with SALs, according to an implementation described herein.
Figure 7B:
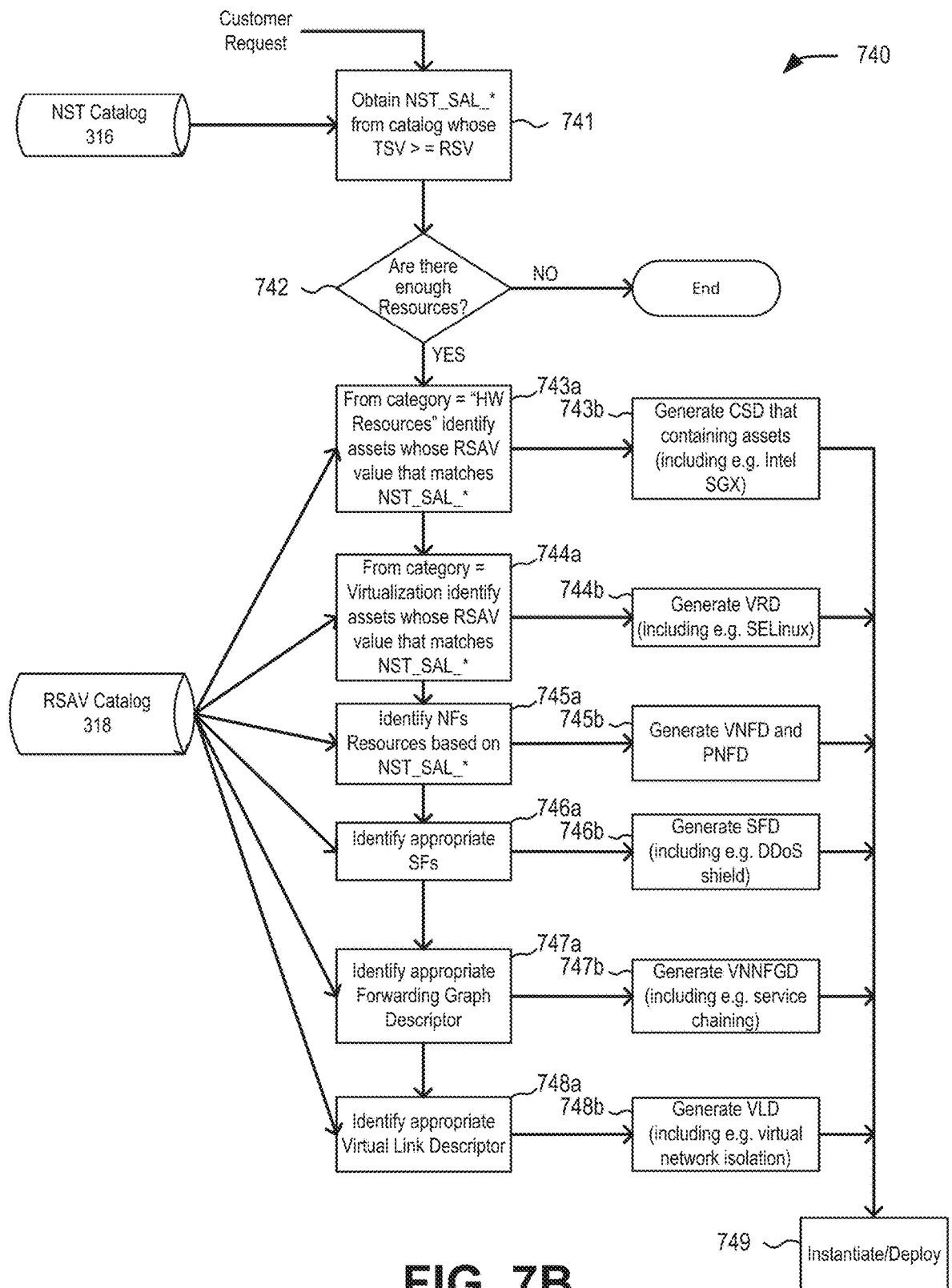

FIGS. 7A and 7B are flow diagrams of an exemplary process 700 for orchestrating slice security in a network. In one implementation, process 700 may be implemented by one or more of SOP 110. In another implementation, process 700 may be implemented by SOP 110 in conjunction with service portal 112 and/or one or more network functions core network portion 108.

Process 700 may include storing definitions of multiple security assurance levels for network slices based on security parameters of assets used in the network slices (block 710). For example, SOP 110 may store slice security class definitions 312. In one implementation, slice security class definitions 312 may include default asset parameters for different SALs. In another implementation, different combinations of asset parameters may be mapped to different SALs.

Process 700 may additionally include configuring network slice templates with different SALs using the network assets (block 720). For example, service portal 112 may provide a SAL request to SOP 110. SOP 110 may map security features for the SAL to a network implementation, which includes supporting security infrastructure (e.g., network functions) and configurations of such infrastructure (e.g., firewall setting, encryption setting, etc.). SOP 110 (e.g., slice designer 320) may design and deploy a network slice with the requested SAL and NSD. SOP 110 may store multiple SAL-level NSTs associated with an NSD. For example, SOP 110 may apply a SAL-level NSTs associated with an NSD (e.g., a very high SAL NST (NST_SAL_VH), a high SAL NST (NST_SAL_H), a medium SAL NST (NST_SAL_M), or a basic SAL NST (NST_SAL_B)).

Process 700 may also include receiving a request for a network connection with a designated security assurance level of the multiple security assurance levels (block 730). For example, using service portal 112 a customer (e.g., private network 104) may use service portal 112 to request a SAL (e.g., basic, medium, high, very high, etc.) for private network 104. Alternatively, a customer may use service portal 112 to indicate particular asset parameters (such as platform isolation parameters, data-in-transit parameters, etc.) that can be mapped to a SAL.

Process 700 may further include deploying the network slice with the designated security assurance level (block 740). For example, SOP 110 may perform onboarding and instantiation procedures to provide a network slice that meets the customer request. Process block 740 is described further in connection with FIG. 7B. As shown in FIG. 7B, SOP 110 may retrieve an NST for a network slice that has a required NSD and a security assurance level that corresponds to the requested security assurance level (block 741). More particularly, SOP 110 may select an NST_SAL_* template with a theoretical SAL value (TSV) that is greater than or equal to the customer's requested SAL value (RSV). As shown in block 742, SOP 110 may determine if there sufficient resources to provide the requested network slice. For example, using assets listed in the NST, SOP 110 may determine if there are sufficient network resources to support the requested SAL. If not, (block 742—No), the onboarding processes may stop. If there are sufficient resources (block 742—Yes), SOP 110 may identify different types of assets from RSAV catalog 318 that are needed to support the NST_SAL_* and generate corresponding descriptors for each asset type. For example, SOP 110 may identify individual assets from RSAV catalog 318 with RSAVs that meet requirements in the NST_SAL_* (e.g., NST_SAL_VH, NST_SAL_H, NST_SAL_M, or NST_SAL_B), such as hardware assets (block 743a), virtual assets (block 744a), network functions (block 745a), software functions (block 746a), forwarding graph descriptors (block 747a), virtual link descriptor (block 748a), etc. As further shown in FIG. 7B, SOP 110 may generate corresponding descriptors for each asset type, such as a compute storage descriptor (CSD) (block 743b), a virtualization resource descriptor (VRD) (block 744b), a virtual network function descriptor (VNFD) and physical network function descriptor (PNFD) (block 745b), a software function descriptor (SFD) (block 746b), a virtual network functions forwarding graph descriptor (VNFFGD) (block 747b), and a virtual link descriptor (VLD) (block 748b). Once the available resources are onboarded, SOP 110 may instantiate the assets, connect the NFs and SFs, and isolate the assets based on the VNFFGD. SOSP 110 may configure all the assets using security policies for the SAL. SOP 110 may then execute and deploy the assets to make the network slice (block 749).

Process 700 may also include monitoring and adjusting for threat escalation (block 750). For example, at run-time, SOP 110 may determine a baseline profile (e.g., a numerical value) for the deployed network slice, based on RSAVs for the individual attributes. Using the baseline as a threshold, SOP 110 may monitor for changes to MSV that may be computed based on the RSAVs associated with each of the individual slice assets. If the MSV number falls below the baseline, SOP 110 may determine there is an actual or potential attack. If an attack is detected, SOP 110 may identify one or more of the deployed assets that are used to mitigate the attack. SOP 110 may determine if there is an available candidate asset (in the same asset class as the deployed asset) that has a higher RSAV than the deployed asset. If there is an available candidate asset with a higher RSAV, SOP 110 may reconfigure the network slice with the candidate asset. If there is not an available candidate asset with a higher RSAV within the same asset class, SOP 110 may determine a different asset class and associated asset which may be used in conjunction with the current asset class and a higher RSAV than the deployed asset to be deployed in the slice. If there are no more assets within the same asset class or other asset classes then the SOP 110 may switch traffic to a higher security slice. For example, SOP 110 may obtain a NST for a next-higher SAL than used in block 740 and deploy the network slice with the next higher security assurance level.

Figure 8A:
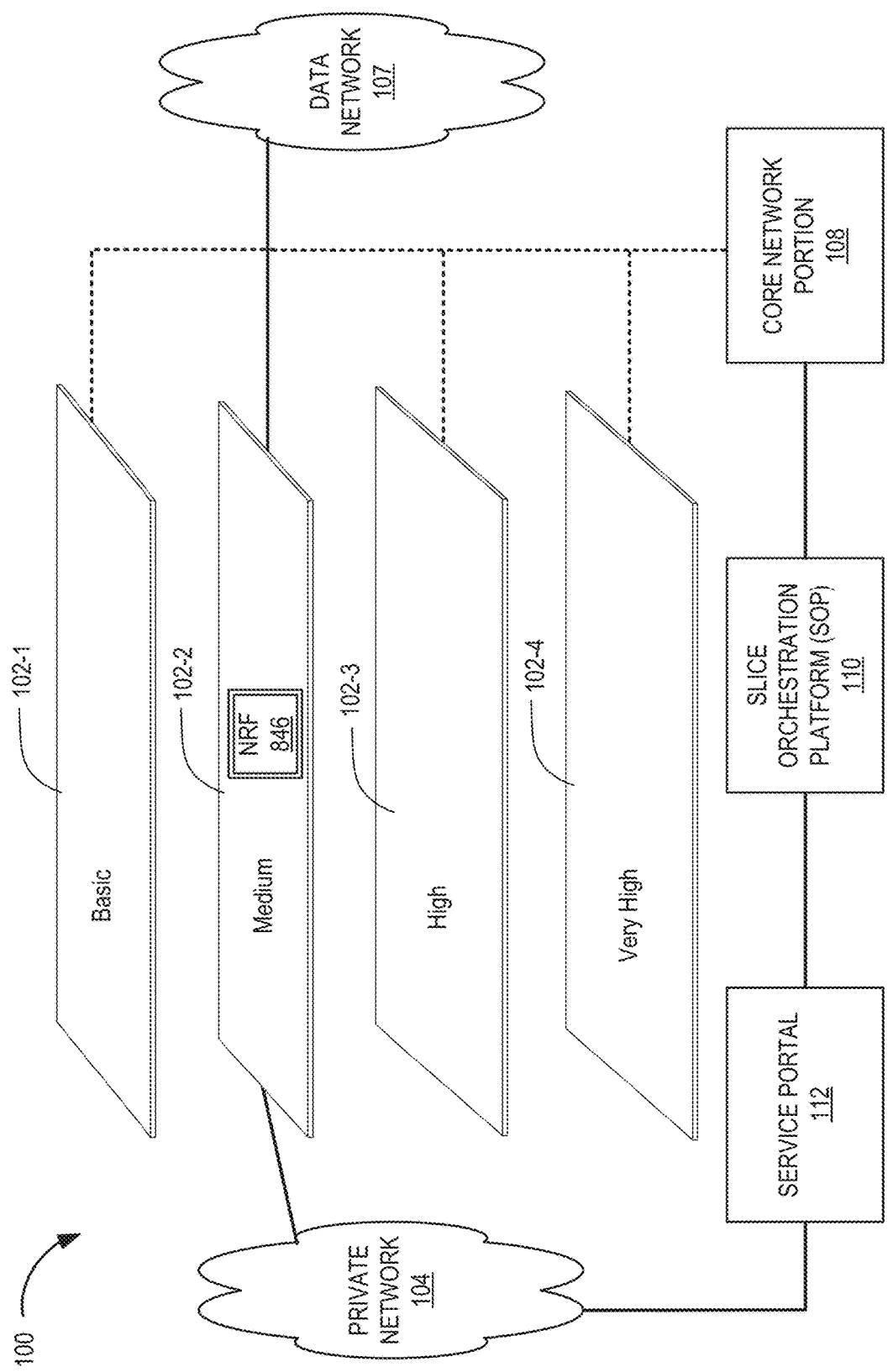
FIGS. 8A-8C illustrate a use case described herein.
Figure 8B:
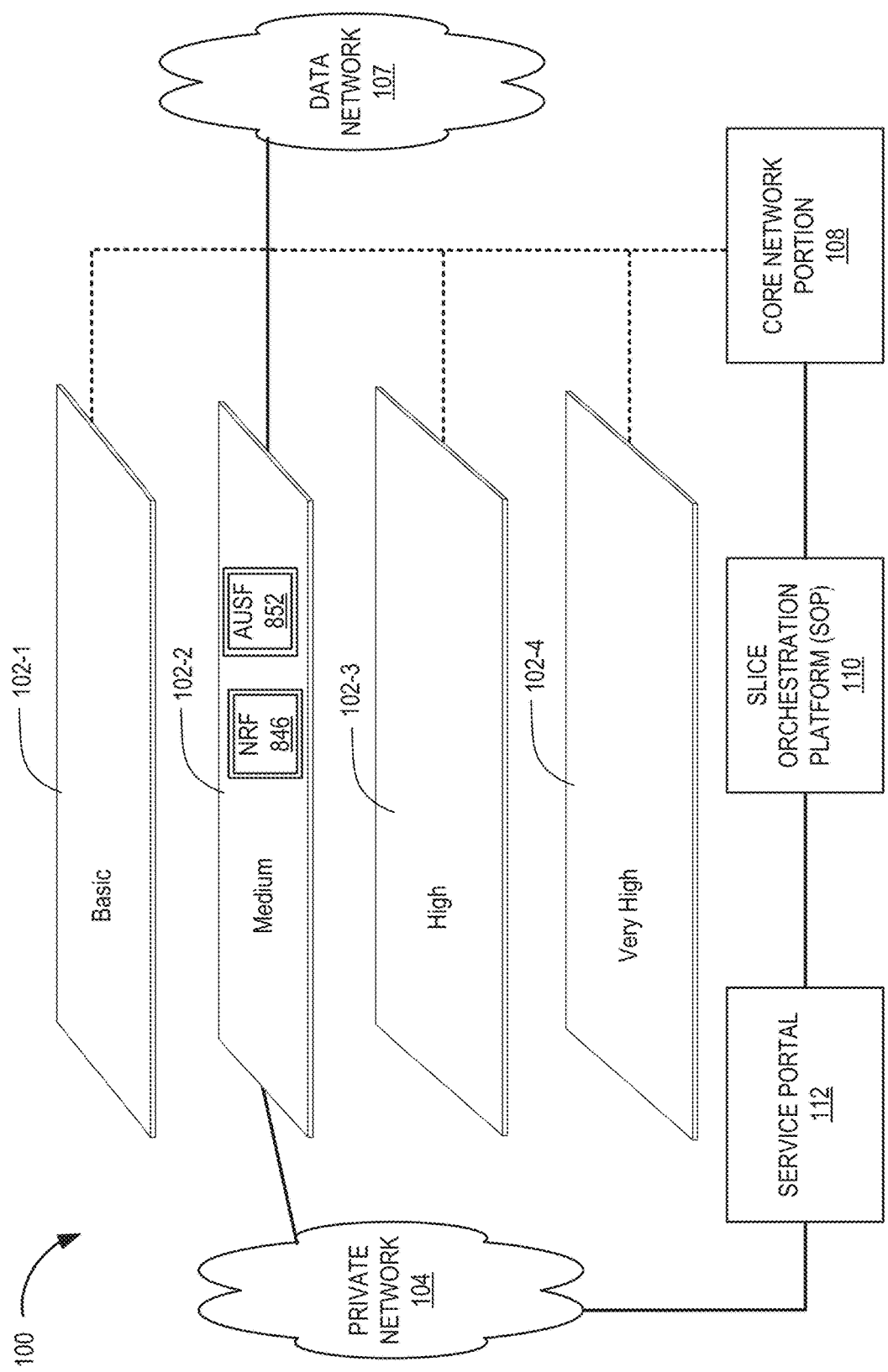
Figure 8C:
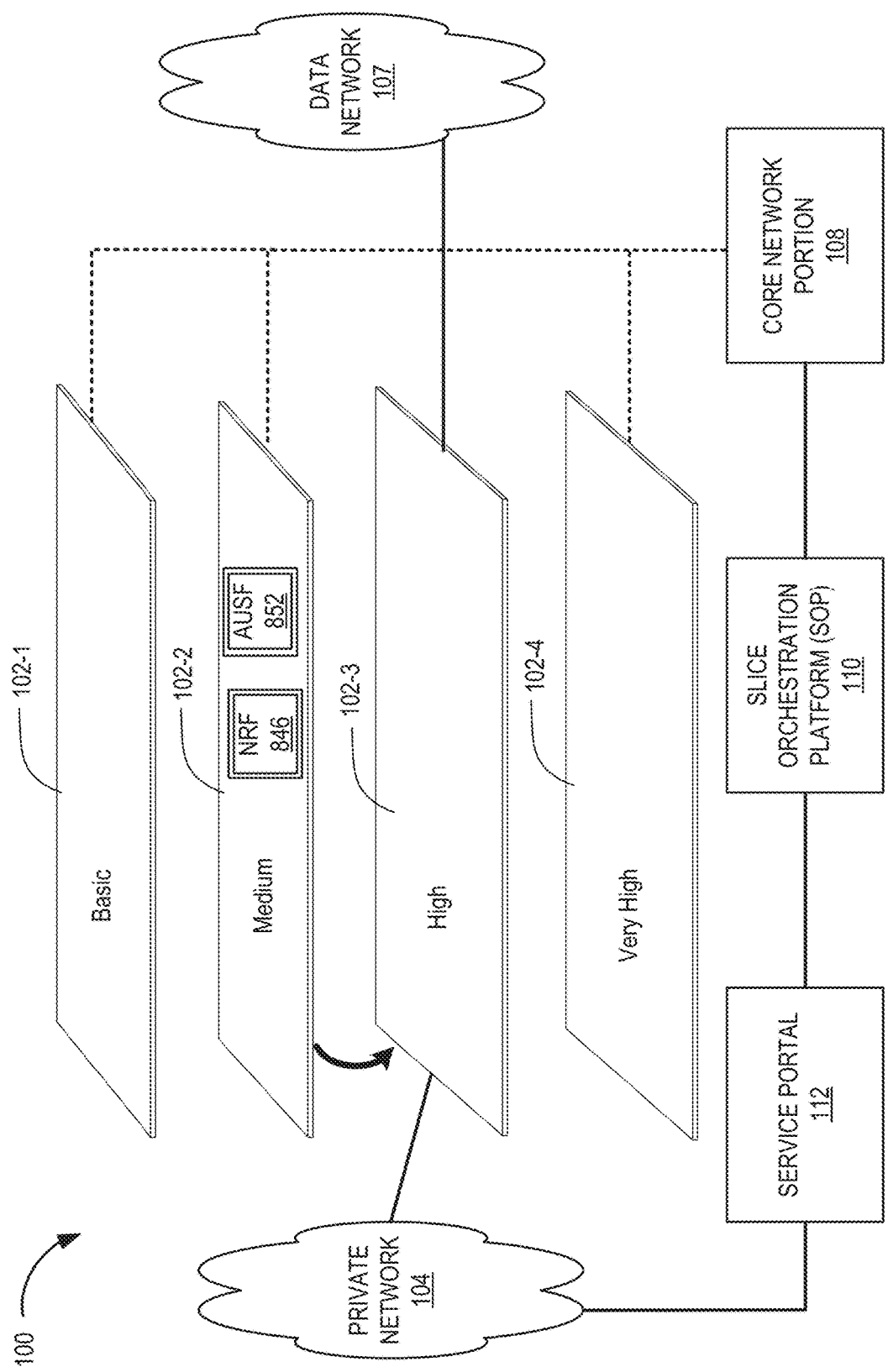

FIGS. 8A-8C illustrate a use case according to an implementation. Assume provider network 100 offers different security levels for network services, such as basic, medium, high and very high. As part of each security assurance level (a) a set of security-related features are enabled, (b) a set of security related functions (e.g., firewall, intrusion detection) are put in place, and (c) a series of mitigation steps are designated in the event of an attack. As an example, one security feature may include a hardware isolation level, where certain network functions (e.g., ranging between none and all, depending on the hardware isolation level) in a slice may be implemented on isolated hardware. Assume there are six levels of hardware isolation, differentiated by the type of NFs deployed on isolated hardware (isolated from other NFs). The five levels may include: L0 (no hardware isolation); L1 (deploying an authorization function (e.g., NRF 246) in isolated hardware); L2 (deploying both an authentication function (e.g., AUSF 252) and authorization function in isolated hardware); L3 (deploying all control plane NFs in isolated hardware); L4 (deploying any NF under attack in isolated hardware); L5 (deploying every NF in isolated hardware).

An administrator of private network 104 (e.g., a customer of provider network 100) uses service portal 112 to choose a "medium" security assurance level for private network 104 (e.g., corresponding to slice 102-2). The "medium" security level is configured to use L1 hardware isolation, and escalate to L2 hardware isolation if a threat is detected. In response to the selection, upon initial slice deployment, SOP 110 will create an authorization function instance (e.g., NRF 846) for slice 102-2 and put the NRF 846 in its own isolated hardware environment, as illustrated in FIG. 8A.

Assume an attack is detected. For example, SOP 110 may employ automated mechanisms (e.g., artificial intelligence and machine learning (AI/ML)-based models), traditional intrusion prevention mechanisms, or other threat detection methods. According to an implementation, SOP 110 may detect that slice 102-2 the MSV falls below a threshold (e.g., cumulative RSAV), as described above. In FIG. 8B, upon threat detection, SOP 110 may create an authentication function instance (e.g., AUSF 852) for slice 102-2 (with appropriate context synchronization) and put AUSF 852 in its own isolated hardware environment.

Based on the detected threat risk, SOP 110 may take additional actions besides isolation, such as traffic handling (e.g., blocking, throttling), higher "data-at-rest" and/or "data-in-transit" security, switching to available certified products, etc. The basis of detection and mitigation may be based on Security Orchestration Automation and Response model. If a MSV falls significantly (e.g., more than 5%, 10%, 20% or another configured amount) below the threshold in slice 102-2, or if initial mitigation attempts do not reduce the threat, SOP 110 may swap traffic for private network 104 to a slice with a higher SAL (e.g., slice 102-3), as shown via the arrow in FIG. 8C.

FIG. 9 is a diagram illustrating isolation parameters for a network slicing template. More specifically, FIG. 9 illustrates a cryptographic isolation parameter 902 that be used to further differentiate asset security levels. As shown in FIG. 9, cryptographic isolation parameter 902 may be used as a new value "3." Cryptographic isolation may be included with traditional slice template parameters of No Isolation, Physical Isolation, and Logical Isolation. As further shown in FIG. 9, cryptographic isolation parameter 902 may indicate different types of cryptography, ranging from weakest (level 0) to strongest (level 3) cryptography. For example, as shown in FIG. 9, parameters may include "0: Standard Crypto," "1: Strong Crypto," "2: Very Strong Crypto," and "3: Post Quantum Crypto (PQC)."

Systems and methods enable the provisioning of security as a service for network slices. A network device stores definitions of multiple security assurance levels for network slices based on security parameters of assets used in the network slices. The network device designs multiple network slice templates having different security assurance levels for the same Network Service Descriptors (NSDs). The network device receives a request for a network slice with a requested security assurance level and deploys the network slice using one of the multiple network slice templates that has a security assurance level that corresponds to the requested security assurance level.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of signal flows have been described with regard to the processes illustrated in FIGS. 7A-7B, the order of the signal flows may be modified according to other embodiments. Further, non-dependent signal flows may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 620, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 620) of a device. A non-transitory storage medium includes one or more of the storage mediums described in relation to memory 630.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
   storing, by a network device, multiple network slice templates that have multiple different security assurance level (SALs) based on a compilation of security parameter values of individual asset classes;
   receiving a request for a network slice with a requested SAL;
   deploying the network slice using one of the multiple network slice templates with a theoretical SAL value that corresponds to the requested SAL;
   establishing a measured SAL as a baseline value for the deployed network slice, wherein the measured SAL is based on measurements of the security parameter values of individual assets of the deployed network slice;
   monitoring the security parameter values of the individual assets of the deployed network slice; and
   detecting, based on the monitoring, a change from the baseline value in the deployed network slice.

2. The method of claim 1, wherein the method further comprises:
   calculating an updated SAL for the deployed network slice based on the monitoring.

3. The method of claim 1, further comprising:
   transferring, in response to the detecting, network traffic from the deployed network slice to another network slice with a higher SAL, of the multiple-different SALs, than the requested SAL.

4. The method of claim 1, further comprising:
   storing definitions of the multiple different SALs for network slices based on the security parameter values of the individual assets of the network slices.

5. The method of claim 1, further comprising:
   detecting, based on the monitoring, a security threat on the deployed network slice;
   identifying a mitigation asset for the deployed network slice; and
   automatically adapting a configuration of the deployed network slice with the mitigation asset based on the detection of security threat.

6. The method of claim 1, wherein the individual asset classes include physical hardware platforms with different degrees of isolation, and wherein the security parameter values include one of multiple isolation parameter values for the physical hardware platforms.

7. The method of claim 1, wherein the security multiple isolation parameter values include:
   a physical isolation parameter,
   a logical isolation parameter, and
   a cryptographic isolation parameter.

8. The method of claim 1, further comprising:
   providing a catalog of available security parameters, including the security parameter values.

9. The method of claim 1, further comprising:
   assigning default security parameters associated with the requested SAL.

10. The method of claim 1, further comprising:
    calculating, based on the security parameter values, relative security assurance values (RSAVs) of the individual assets of the deployed network slice; and
    dynamically updating the RSAVs for the individual assets of the deployed network slice.

11. A network device, comprising:
a processor configured to:
- store multiple network slice templates that have multiple different security assurance level (SALs) based on a compilation of security parameter values of individual asset classes;
- receive a request for a network slice with a requested SAL;
- deploy the network slice using one of the multiple network slice templates with a theoretical SAL value that corresponds to the requested SAL;
- establish a measured SAL as a baseline value for the deployed network slice, wherein the measured SAL is based on measurements of the security parameter values of individual assets of the deployed network slice;
- monitor the security parameter values of individual assets of the deployed network slice; and
- detect, based on the monitoring, a change from the baseline value in the deployed network slice.

12. The network device of claim 11, wherein the processor is further configured to:
- calculate an updated SAL for the deployed network slice based on the monitoring.

13. The network device of claim 11, wherein the processor is further configured to:
- detect, based on the-monitoring, a security threat on the deployed network slice.

14. The network device of claim 13, wherein the processor is further configured to:
- identify a mitigation asset for the deployed network slice; and
- adapt a configuration of the deployed network slice with the mitigation asset based on the detection of the security threat.

15. The network device of claim 11, wherein the security parameter values include multiple isolation parameter values for physical hardware platforms with different degrees of isolation within the individual assets.

16. The network device of claim 11, wherein the processor is further configured to:
- provide a catalog of available security parameters, including the security parameter values.

17. The network device of claim 11, wherein the processor is further configured to:
- provide to a user a list of service requirements regarding security for the network slice.

18. A non-transitory computer-readable medium containing instructions executable by at least one processor, the computer-readable medium comprising one or more instructions for:
- storing, by a network device, multiple network slice templates that have multiple different security assurance level (SALs) based on a compilation of security parameter values of individual asset classes;
- receiving a request for a network slice with a requested SAL;
- deploying the network slice using one of the multiple network slice templates with a theoretical SAL value that corresponds to the requested SAL;
- establishing a measured SAL as a baseline value for the deployed network slice, wherein the measured SAL is based on measurements of the security parameter values of individual assets of the deployed network slice;
- monitoring the security parameter values of individual assets of the deployed network slice; and
- detecting, based on the monitoring, a change from the baseline value in the deployed network slice.

19. The non-transitory computer-readable medium of claim 18, further comprising one or more instructions for:
- transferring, in response to the detecting, network traffic from the deployed network slice to another network slice with a higher SAL, of the multiple-different SALs, than the requested SAL.

20. The non-transitory computer-readable medium of claim 18, further comprising one or more instructions for:
- storing definitions of the multiple different SALs for network slices based on the security parameter values of the individual assets of the network slices; and
- calculating an updated SAL for the deployed network slice based on the monitoring.

\* \* \* \* \*